United States Patent
Li

(10) Patent No.: US 10,885,873 B2
(45) Date of Patent: Jan. 5, 2021

(54) METHOD AND APPARATUS FOR DISPLAYING INTERFACE IMAGE

(71) Applicant: BEIJING XIAOMI MOBILE SOFTWARE CO., LTD., Beijing (CN)

(72) Inventor: Guosheng Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 135 days.

(21) Appl. No.: 16/163,535

(22) Filed: Oct. 17, 2018

(65) Prior Publication Data

US 2019/0172417 A1 Jun. 6, 2019

(30) Foreign Application Priority Data

Dec. 5, 2017 (CN) .......................... 2017 1 1265222

(51) Int. Cl.
*G06F 1/26* (2006.01)
*G06F 1/32* (2019.01)
(Continued)

(52) U.S. Cl.
CPC .......... *G09G 5/028* (2013.01); *G06F 1/3265* (2013.01); *G09G 3/3406* (2013.01);
(Continued)

(58) Field of Classification Search
CPC .. G09G 5/028; G09G 3/3406; G09G 2340/06; G09G 2360/144;
(Continued)

(56) References Cited

U.S. PATENT DOCUMENTS 6,483,485 B1 11/2002 Huang et al.
2005/0140616 A1 6/2005 Sohn et al.
(Continued)

FOREIGN PATENT DOCUMENTS

CN 100417186 C 9/2008
CN 101488323 A 7/2009
(Continued)

OTHER PUBLICATIONS

International Search Report in PCT/ CN2018/082533 dated Sep. 10, 2018.
(Continued)

*Primary Examiner* — Xuxing Chen
(74) *Attorney, Agent, or Firm* — Syncoda LLC; Feng Ma

(57) ABSTRACT

A method of displaying an interface image includes: acquiring a currently displayed interface image, and determining a grayscale of each pixel point of the interface image; in the grayscales of all the pixel points, determining the number of each grayscale; acquiring N grayscales, the numbers of the N grayscales being the first N largest numbers, where N is a preset positive integer; when each difference between the N grayscales exceeds a first preset value, and a ratio of a sum of the numbers of the N grayscales to a sum of the numbers of all the grayscales exceeds a second preset value, determining a brightness adjustment parameter corresponding to the interface image; and reducing a current backlight brightness based on the brightness adjustment parameter.

20 Claims, 4 Drawing Sheets

(51) Int. Cl.
  *G09G 5/02*   (2006.01)
  *G09G 3/34*   (2006.01)
  *G06F 1/3234* (2019.01)

(52) U.S. Cl.
  CPC .......... *G09G 2320/066* (2013.01); *G09G 2320/0626* (2013.01); *G09G 2320/0666* (2013.01); *G09G 2330/021* (2013.01); *G09G 2340/06* (2013.01); *G09G 2360/144* (2013.01); *G09G 2360/16* (2013.01)

(58) Field of Classification Search
  CPC ......... G09G 2330/021; G09G 2360/16; G09G 2320/0666; G09G 2320/066; G09G 2320/0626; G09G 5/10; G06F 1/3265; H04M 1/72569
  See application file for complete search history.

(56) References Cited

U.S. PATENT DOCUMENTS

| | | | |
|---|---|---|---|
| 2009/0167658 A1 | 7/2009 | Yamane et al. | |
| 2010/0182338 A1 | 7/2010 | Hedin et al. | |
| 2011/0199398 A1* | 8/2011 | Yui | G09G 3/22 345/690 |
| 2011/0229019 A1 | 9/2011 | Batur et al. | |
| 2012/0287172 A1 | 11/2012 | Lin et al. | |
| 2014/0139541 A1 | 5/2014 | Willaert et al. | |
| 2016/0173862 A1 | 6/2016 | Huang et al. | |
| 2017/0229072 A1 | 8/2017 | Xing et al. | |
| 2018/0242887 A1* | 8/2018 | Dong | A61B 5/16 |
| 2018/0370455 A1* | 12/2018 | Daujotas | B60R 1/12 |

FOREIGN PATENT DOCUMENTS

| | | |
|---|---|---|
| CN | 103763460 A | 4/2014 |
| CN | 104599642 A | 5/2015 |
| CN | 104700786 A | 6/2015 |
| CN | 104905803 A | 9/2015 |
| CN | 104934016 A | 9/2015 |
| CN | 106873755 A | 6/2017 |
| CN | 106919358 A | 7/2017 |
| EP | 3040974 A | 7/2016 |
| JP | 2009294323 A | 12/2009 |
| KR | 20090031199 A | 3/2009 |
| KR | 20160092485 A | 8/2016 |
| KR | 20170030453 A | 3/2017 |
| RU | 2611005 C2 | 2/2017 |
| WO | 2013018472 A1 | 2/2013 |

OTHER PUBLICATIONS

International Search Report dated Sep. 10, 2018 in PCT/CN2018/082533.
European Search Report dated Jan. 23, 2019 in EP 18209842.6.
Second Office Action of Korean Application No. 10-2018-7028055 dated Jun. 22, 2020.

* cited by examiner

METHOD AND APPARATUS FOR DISPLAYING INTERFACE IMAGE

CROSS-REFERENCE TO RELATED APPLICATIONS

This application claims priority to Chinese Patent Application No. 201711265222.6, filed Dec. 5, 2017, the disclosure of which is hereby incorporated by reference in its entirety.

BACKGROUND

With the development of computer technologies, mobile phones and other mobile terminals have become modern essential items, and play an increasingly important role in daily lives.

SUMMARY

The present disclosure relates generally to the field of computer technologies, and more specifically to a method and apparatus for displaying an interface image.

The inventors of the present disclosure have recognized that, with the increasing size of screens of the mobile phones, the screens of the mobile phone have become the most important part of the overall power consumption of the mobile phones. Therefore, there is an urgent need for a method for reducing the power consumption of the screens of the mobile phone.

Various embodiments of the present disclosure provide a method and apparatus for displaying an interface image.

In a first aspect, a method is provided for displaying an interface image, including:
  acquiring a currently displayed interface image, and determining a grayscale of each pixel point of the interface image;
  in the grayscales of all the pixel points, determining the number of each grayscale;
  acquiring N grayscales, the numbers of the N grayscales being the first N largest numbers, where N is a preset positive integer;
  when each difference between the N grayscales exceeds a first preset value, and a ratio of a sum of the numbers of the N grayscales to a sum of the numbers of all the grayscales exceeds a second preset value, determining a brightness adjustment parameter corresponding to the interface image; and
  reducing a current backlight brightness based on the brightness adjustment parameter.

In some embodiments, the determining the brightness adjustment parameter corresponding to the interface image includes:
  determining a contrast of the interface image; and
  determining a brightness adjustment parameter corresponding to a contrast range to which the contrast of the interface image belongs according to a pre-stored corresponding relationship between the contrast range and the brightness adjustment parameter.

In some embodiments, the determining the brightness adjustment parameter corresponding to the contrast range to which the contrast of the interface image belongs according to the pre-stored corresponding relationship between the contrast range and the brightness adjustment parameter includes:
  acquiring a current ambient light brightness; and
  determining the brightness adjustment parameter corresponding to the interface image according to the current ambient light brightness, the contrast of the interface image, and a pre-stored corresponding relationship among the contrast range, the ambient light brightness range and the brightness adjustment parameter.

In some embodiments, the determining the brightness adjustment parameter corresponding to the contrast range to which the contrast of the interface image belongs according to the pre-stored corresponding relationship between the contrast range and the brightness adjustment parameter includes:
  acquiring a current backlight brightness;
  determining the brightness adjustment parameter corresponding to the interface image according to the current backlight brightness, the contrast corresponding to the interface image, and a pre-stored corresponding relationship among the contrast range, the backlight brightness range, and the brightness adjustment parameter.

In some embodiments, prior to the determining the grayscale of each pixel point of the interface image, the method further includes:
  acquiring a current ambient light brightness; and
  determining whether the current ambient brightness is within a preset brightness range.

In some embodiments, prior to the determining the grayscale of each pixel point of the interface image, the method further includes:
  acquiring a current backlight brightness; and
  determining whether the current backlight brightness is greater than a third preset value.

In some embodiments, the brightness adjustment parameter is an adjustment brightness; and
  the reducing the current backlight brightness according to the brightness adjustment parameter includes:
  subtracting the adjustment brightness corresponding to the interface image from the current backlight brightness to obtain a reduced backlight brightness.

In some embodiments, the brightness adjustment parameter is an adjustment ratio; and
  the reducing the current backlight brightness according to the brightness adjustment parameter includes:
  multiplying the current backlight brightness by the adjustment ratio corresponding to the interface image to obtain a reduced backlight brightness; or
  calculating a product of the current backlight brightness and the adjustment ratio corresponding to the interface image, and subtracting the product from the current backlight brightness to obtain a reduced backlight brightness.

In some embodiments, prior to the determining the grayscale of each pixel point of the interface image, the method further includes:
  mapping the interface image to an HSV space or a YUV space;
  the determining the grayscale of each pixel point of the interface image includes:
  determining the grayscale of each pixel point of the interface image based on lightness information of the HSV space or lightness information of the YUV space.

In another aspect, an apparatus is provided for displaying an interface image, including:
  an acquisition portion or module configured to acquire a currently displayed interface image, and determine a grayscale of each pixel point of the interface image;

the acquisition module is further configured to determine the number of each grayscale in the grayscales of all the pixel points;

the acquisition module is further configured to acquire N grayscales, the numbers of the N grayscales being the first N largest numbers, where N is a preset positive integer;

the acquisition module is further configured to, when each difference between the N grayscales exceeds a first preset value, and a ratio of a sum of the numbers of the N grayscales to a sum of the numbers of all the grayscales exceeds a second preset value, determine a brightness adjustment parameter corresponding to the interface image; and an adjustment module configured to reduce a current backlight brightness based on the brightness adjustment parameter.

Alternatively, the acquisition module is further configured to:

determine a contrast of the interface image; and determine a brightness adjustment parameter corresponding to a contrast range to which the contrast of the interface image belongs according to a pre-stored corresponding relationship between the contrast range and the brightness adjustment parameter.

In a third aspect, a non-transitory computer-readable storage medium is provided, wherein at least one instruction, at least one program, code set or instruction set is stored in the storage medium, and the at least one instruction, the at least one program, the code set or the instruction set is loaded and executed by a processor to implement the method for displaying an interface image according to the above first aspect.

In some embodiments, the determining the brightness adjustment parameter corresponding to the interface image includes:

determining a contrast of the interface image; and determining a brightness adjustment parameter corresponding to a contrast range to which the contrast of the interface image belongs according to a pre-stored corresponding relationship between the contrast range and the brightness adjustment parameter; and wherein the determining the brightness adjustment parameter corresponding to the contrast range to which the contrast of the interface image belongs according to the pre-stored corresponding relationship between the contrast range and the brightness adjustment parameter includes:

acquiring a current ambient light brightness; and determining the brightness adjustment parameter corresponding to the interface image according to the current ambient light brightness, the contrast of the interface image, and a pre-stored corresponding relationship among the contrast range, the ambient light brightness range and the brightness adjustment parameter.

In a fourth aspect, an apparatus is provided for displaying an interface image, including: a processor and memory, wherein the memory stores at least one instruction, at least one program, a code set or an instruction set, and the at least one instruction, the at least one program, the code set, or the instruction set is loaded and executed by the processor to implement the method for displaying an interface image according to the above first aspect.

In some embodiments, the processor is further configured to perform:

determining a contrast of the interface image; and determining a brightness adjustment parameter corresponding to a contrast range to which the contrast of the interface image belongs according to a pre-stored corresponding relationship between the contrast range and the brightness adjustment parameter.

In some embodiments, the processor is further configured to perform:

acquiring a current ambient light brightness; and determining the brightness adjustment parameter corresponding to the interface image according to the current ambient light brightness, the contrast of the interface image, and a pre-stored corresponding relationship among the contrast range, the ambient light brightness range and the brightness adjustment parameter.

In some embodiments, the processor is further configured to perform:

acquiring a current backlight brightness;

determining the brightness adjustment parameter corresponding to the interface image according to the current backlight brightness, the contrast corresponding to the interface image, and a pre-stored corresponding relationship among the contrast range, the backlight brightness range, and the brightness adjustment parameter.

In some embodiments, the processor is further configured to perform:

acquiring a current ambient light brightness; and determining that the current ambient brightness is within a preset brightness range.

In some embodiments, the processor is further configured to perform:

acquiring a current backlight brightness; and determining that the current backlight brightness is greater than a third preset value.

In some embodiments, the brightness adjustment parameter is an adjustment brightness; and wherein the processor is further configured to perform:

subtracting the adjustment brightness corresponding to the interface image from the current backlight brightness to obtain a reduced backlight brightness.

In some embodiments, the brightness adjustment parameter is an adjustment ratio; and wherein the processor is further configured to perform:

multiplying the current backlight brightness by the adjustment ratio corresponding to the interface image to obtain a reduced backlight brightness; or calculating a product of the current backlight brightness and the adjustment ratio corresponding to the interface image, and subtracting the product from the current backlight brightness to obtain a reduced backlight brightness.

In some embodiments, the processor is further configured to perform:

mapping the interface image to an HSV space or a YUV space; and the determining the grayscale of each pixel point of the interface image, comprises:

determining the grayscale of each pixel point of the interface image based on lightness information of the HSV space or lightness information of the YUV space.

It is to be understood that the above general description and the below detailed description are only illustrative and explanatory, and are not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

Figure 1:
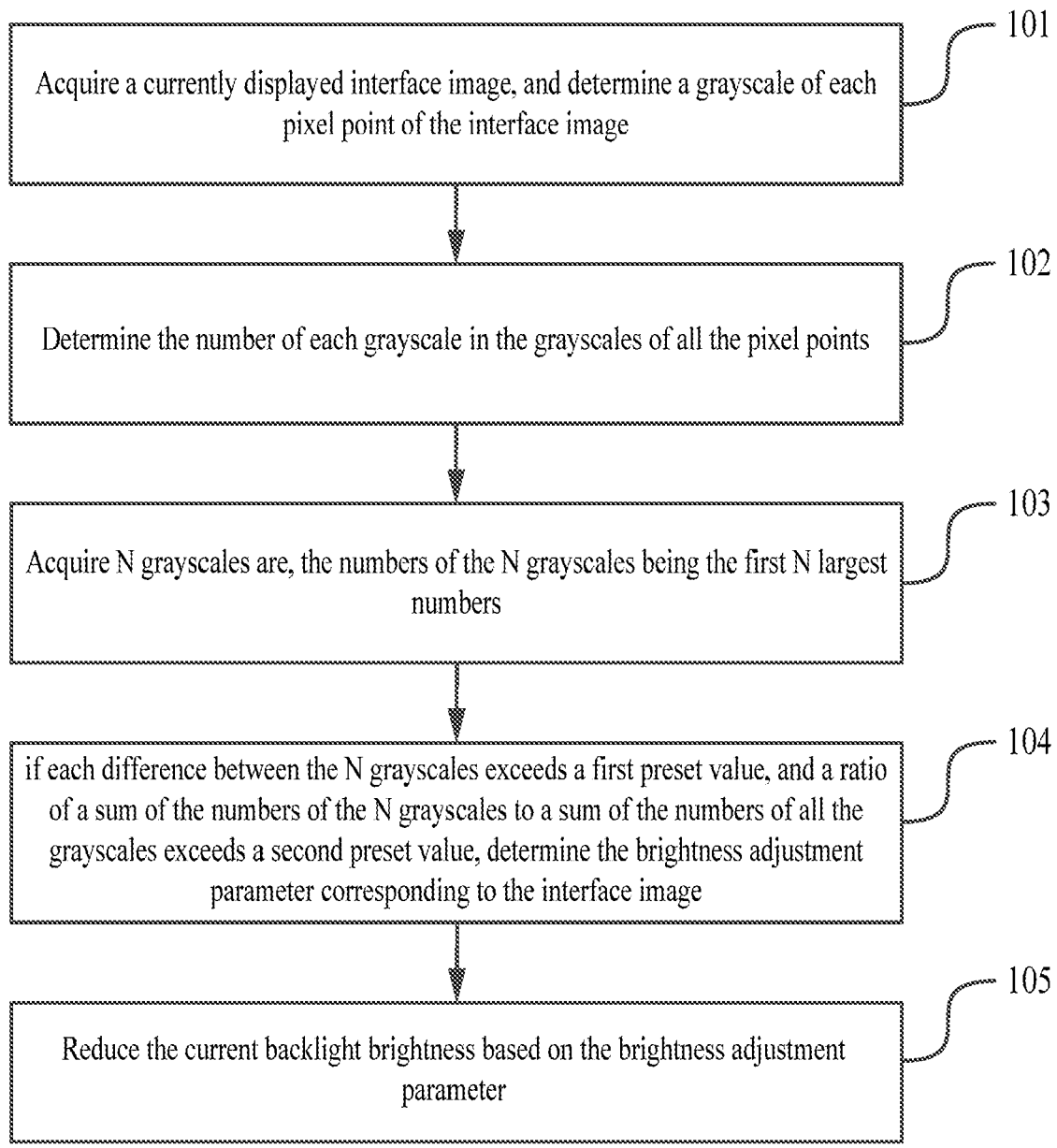
FIG. 1 is a flowchart of a method for displaying an interface image according to some embodiments.

Specific embodiments in this disclosure have been shown by way of examples in the drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated. Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Various embodiments of the present disclosure provide a method for displaying an interface image, where an execution body of the method may be a terminal. The terminal may be a mobile terminal used by a user, such as a mobile phone. The terminal may be provided with a processor, memory, a transceiver, and the like.

The processor may be used to process the procedure of displaying an interface image, and the memory may be used to store the data required during the process of displaying the interface image and the generated data, and the transceiver may be used to receive and send data. The terminal may also be provided with an input/output device such as a screen, a light sensor, etc. The screen may be used for displaying an interface of an application program, etc. The light sensor may be used for detecting an ambient light intensity. In this embodiment, the technical solutions will be described in detail by using a mobile phone as the terminal for example. The detailed description is similar to other situations and will not be described in this embodiment.

As shown in FIG. 1, the process flow of the method may include the following steps.

In step 101, a currently displayed interface image is acquired, and a grayscale of each pixel point of the interface image is determined.

The interface image refers to a content displayed on a screen of the terminal, and the grayscale represents a level of brightness from the darkest to the brightest, generally being 0-255, and there being a total of 256 levels.

Figure 2:
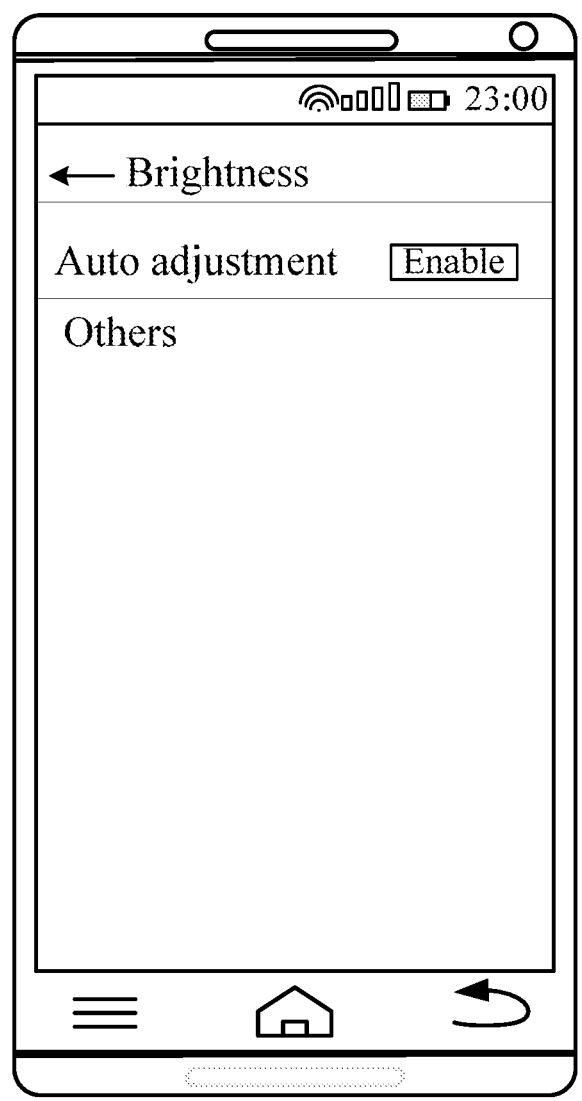
FIG. 2 is a schematic diagram of an automatic adjustment option according to some embodiments.

In the implementation, as shown in FIG. 2, an automatic adjustment option is set in setting options of the terminal, and the user may operate to enable the automatic adjustment option, and then the terminal may determine that the function of automatic adjusting the backlight brightness is turned on. The terminal may obtain the currently displayed interface image, determine R (Red), G (Green), and B (Blue) of each pixel point of the interface image, and then use the R, G, and B of each pixel point to determine grayscales to which individual pixels of the interface image belong respectively.

Optionally, based on a YUV space or an HSV space, the grayscales of individual pixel points of the interface image may be determined, and the corresponding process may be as follows:

mapping the interface image to the HSV space or the YUV space, and based on lightness information of the HSV space or lightness information of the YUV space, determining the grayscale of each of all pixel points of the interface image.

The HSV space is a color space created by A. R. Smith in 1978 based on the intuitive characteristics of color, also called the Hexcone Model. The color parameters in this model are: hue (H), saturation (S), and brightness (Value, V). The YUV space is a color-coding method (belonging to PAL) adopted by European television system, and is a color space adopted by PAL and SECAM analog color television systems. In the YUV space, the lightness signal Y and the color signals U and V are separated.

In an implementation, after the terminal acquires the currently displayed interface image, the terminal may determine R, G, and B of each pixel point of the interface image, and then use the R, G, and B of each pixel point to map the interface image to the HSV space, to obtain a value of V, a value of H, and a value of S for each pixel point. The value of V is the brightness information in the HSV space, generally V=max (R, G, B), and then the brightness information is used to determine the grayscale of each pixel (This is the same as the related art and will not be repeated herein.).

Alternatively, after the terminal acquires the currently displayed interface image, R, G, and B of each pixel point of the interface image may be determined. For any pixel point of the interface image, the formulas Y=0.299R+0.587G+0.114B, U=−0.147R−0.289G+0.436B, and V=0.615R−0.515G−0.100B may be used to determine Y, U, V of the pixel point. Based on the same way, the Y, U and V of all the pixel points may be calculated. Y is the lightness information of the pixel in the YUV space. For the pixel point, if the value of Y is a decimal, it may be corresponded to the grayscale by rounding. Based on the same manner, the grayscale to which a respective one of the pixel points belongs may be determined. For example, for a certain pixel point, R is 180, G is 78, and B is 100, the determined Y is 111.006, its rounding is 111, and the grayscale to which this pixel point belongs is 111.

Optionally, prior to determining the grayscale of each pixel point of the interface image, an ambient light brightness needs to be determined. The corresponding processing may be as follows:

acquiring a current ambient light brightness, determining that the current ambient light brightness is within a preset brightness range, and determining the grayscale of each pixel point of the interface image.

The preset brightness range may be preset by the technician and stored in the terminal, such as 50 lux~500 lux.

During implementation, after acquiring the currently displayed interface image, the terminal may use a light sensor to detect the ambient light brightness, then determine whether the detected ambient light brightness is within a preset brightness range, and if the ambient light brightness is within the preset brightness range, the grayscale of each pixel point of the interface image may be determined (the determination method has been described in detail above, and will not be repeated here).

Optionally, when the current backlight brightness is relatively large, the brightness of the backlight is adjusted, and the processing of the corresponding step 101 may be as follows:

acquiring a current backlight brightness, determining that the current backlight brightness is greater than a third preset value, and determining the grayscale of each pixel point of the interface image.

The third preset value may be preset by a technician and stored in the terminal.

During implementation, after the terminal acquires the currently displayed interface image, the terminal may determine a current of the current backlight source, and then use the current of the backlight source to determine the corresponding backlight brightness as the current backlight brightness. Then, the terminal may determine whether the current backlight brightness is greater than a third preset value. If the current backlight brightness is greater than the third preset value, the terminal may determine the grayscale of each pixel point of the interface image (the determination method has been described in detail above, and will not be repeated here).

In step 102, the number of each grayscale is determined in the grayscales of all the pixel points.

During implementation, after the terminal determines the grayscale of each pixel point of the interface image, the terminal may perform statistics on the number of each grayscale in the grayscales of all the pixel points. For example, the interface image includes 1024 pixel points. The number of the grayscale 30 is 500, the number of the grayscale 120 is 100, and the number of the grayscale 234 is 424.

In step 103, N grayscales are acquired, the numbers of the N grayscales being the first N largest numbers, where N is a preset positive integer.

N is a preset positive integer, which may be preset by a technician and stored in the terminal, such as 2 and the like.

During implementation, after the terminal determines the number of each grayscale, the terminal may acquire N grayscales with the first N largest number. For example, N is 2, the interface image includes 1024 pixel points, the number of grayscale 30 is 500, the number of grayscale 120 is 100, and the number of grayscale 234 is 424, then 2 grayscales with the maximum number are 30, and 234.

In step 104, if each difference between the N grayscales exceeds a first preset value, and a ratio of a sum of the numbers of the N grayscales to a sum of the numbers of all the grayscales exceeds a second preset value, the brightness adjustment parameter corresponding to the interface image is determined.

Both the first preset value and the second preset value may be preset by a technician and stored in the terminal. The first preset value may be 12 and the second preset value may be 80%.

During implementation, after the terminal acquires the N grayscales with maximum numbers, the terminal may calculate the difference between the N grayscales, calculate the sum of the numbers of the N grayscales, and then determine whether each difference between N grayscales exceeds the first preset value and determine whether the ratio of the sum of the numbers of the N grayscales to the sum of the total number of grayscales exceeds the second preset value.

If the difference between the N grayscales exceeds the first preset value, and the ratio of the sum of the numbers of the N grayscales to the sum of the numbers of all the grayscales exceeds the second preset value, the terminal may determine the brightness adjustment parameter corresponding to the currently displayed interface image, and the brightness adjustment parameter may be a fixed value, which is the same for any interface image that satisfies the above conditions.

For example, the first preset value may be 12, the second preset value may be 80%, N is 2, the interface image includes 1024 pixel points, the number of the grayscale 30 is 500, the number of the grayscale 120 is 100, the number of the grayscale 234 is 424, then the two grayscales having the maximum numbers are the grayscales 30 and 234, and the difference between the two grayscales is 204, which exceeds the first preset value. The sum of the two grayscales is equal to 924. The proportion of the sum of the two grayscales to the sum of the numbers of all the grayscales is 90%, exceeding 80%. Then the terminal may determine the brightness adjustment parameter corresponding to the currently displayed interface image.

Optionally, the method for determining the brightness adjustment parameter corresponding to the interface image may be as follows:

determining a contrast of the interface image, and determining the brightness adjustment parameter corresponding to the contrast range to which the contrast of the interface image belongs according to a pre-stored corresponding relationship between the contrast range and the brightness adjustment parameter.

During implementation, the terminal stores in advance the corresponding relationship between the contrast range and the brightness adjustment parameter, which corresponding relationship may be preset by the technician and stored in the terminal, as shown in Table 1.

TABLE 1

| Contrast range | Brightness adjustment parameter |
|---|---|
| 5~6 | Brightness adjustment parameter 1 |
| 6~7 | Brightness adjustment parameter 2 |
| 7~8 | Brightness adjustment parameter 3 |
| ... | ... |

When the terminal determines that all the differences between the N grayscales exceed the first preset value, and the proportion of the sum of the N grayscales to the sum of the total grayscales exceeds the second preset value, the terminal may use the contrast formula $C=(L_{brightness}+R)/(L_{darkness}+R)$ to calculate the contrast of the currently displayed interface image, wherein R is a reflection brightness of the screen, and is a fixed value for one terminal, $L_{brightness}$ is the brightness of the brightest content of the interface image, and $L_{darkness}$ is the brightness of the darkest content of the interface image. After the terminal determines the maximum grayscale and the minimum grayscale of the interface image, the Gamma response curve may be used to determine the brightness corresponding to the maximum grayscale, that is, the brightness of the brightest content of the interface image, and use the Gamma response curve to determine the brightness corresponding to the minimum grayscale, that is the brightness of the darkest content of the interface image.

After determining the contrast of the currently displayed interface image, the terminal may obtain a corresponding relationship between the contrast range and the brightness adjustment parameter. First, from the corresponding relationship, a contrast range to which the currently displayed interface image belongs is found, and then the brightness adjustment parameter corresponding to the contrast range is determined, i.e., the brightness adjustment parameter of the currently displayed interface image.

Optionally, the method for determining the brightness adjustment parameter corresponding to the interface image based on the ambient light brightness and the contrast of the interface image may be as follows:

acquiring the current ambient light brightness, and determining the brightness adjustment parameter corresponding to the interface image according to the current ambient light brightness, the contrast corresponding to the interface image, and a pre-stored corresponding relationship among the contrast range, the ambient light brightness range, and the brightness adjustment parameter.

During implementation, the terminal stores in advance the corresponding relationship among the ambient light brightness range, the contrast range, and the brightness adjustment parameter. The corresponding relationship may be preset by the technician and stored in the terminal, as shown in Table 2.

TABLE 2

| Ambient light brightness range | Contrast range | Brightness adjustment parameter |
|---|---|---|
| 50 lux~80 lux | 5~6 | Brightness adjustment parameter 1 |
| | 6~7 | Brightness adjustment parameter 3 |
| | 7~8 | Brightness adjustment parameter 4 |
| | ... | ... |
| ... | ... | ... |

After the terminal determines a contrast of the currently displayed interface image, the terminal may acquire the corresponding relationship among the ambient light brightness range, the contrast range, and the brightness adjustment parameter. Firstly, the contrast range to which the contrast of the currently displayed interface image belongs is found from the corresponding relationship, then, the ambient light brightness range to which the current ambient light brightness belongs is found, and then the brightness adjustment parameter corresponding to the determined contrast range and ambient light brightness range is found from the corresponding relationship, that is, the brightness adjustment parameter of the currently displayed interface image.

Optionally, the method for determining the brightness adjustment parameter corresponding to the interface image based on the current backlight brightness and the contrast of the interface image may be as follows:

obtaining the current backlight brightness, and determining the brightness adjustment parameters corresponding to the interface image according to the current backlight brightness, the contrast corresponding to the interface image, and the pre-stored corresponding relationship among the contrast range, the backlight brightness range, and the brightness adjustment parameter.

During implementation, the terminal stores in advance the corresponding relationship among the ambient light brightness range, the contrast range, and the brightness adjustment parameter. The corresponding relationship may be preset by the technician and stored in the terminal.

After the terminal determines the contrast of the currently displayed interface image, the terminal may obtain the corresponding relationship among the backlight brightness range, the contrast range and the brightness adjustment parameter. Firstly, the contrast range to which the contrast of the currently displayed interface image belongs is searched from the corresponding relationship. Then, the backlight brightness range to which the current backlight brightness belongs is searched. And then the brightness adjustment parameter corresponding to the determined contrast range and the backlight brightness range is searched from the corresponding relationship, that is, the brightness adjustment parameter of the currently displayed interface image.

In step 105, the current backlight brightness is reduced based on the brightness adjustment parameter.

During implementation, after the terminal determines the brightness adjustment parameter corresponding to the currently displayed interface image, the terminal may determine a current of the current backlight source (i.e., backlight), and then use the current of the backlight source to determine the corresponding backlight brightness, i.e., the current backlight brightness, and then use the brightness adjustment parameter corresponding to the currently displayed interface image to reduce the current backlight brightness. After the reduction, the current of the corresponding backlight source also decreases, which can reduce the power consumption of the terminal.

Optionally, the brightness adjustment parameter may be an adjustment brightness, and the corresponding processing of step 102 may be as follows:

subtracting the adjustment brightness corresponding to the interface image from the current backlight brightness to obtain a reduced backlight brightness.

The brightness adjustment parameter may be an adjustment brightness, such as 10 lux.

During implementation, after the terminal determines the adjustment brightness corresponding to the currently displayed interface image, the terminal may determine the current of the current backlight source, and then use the current of the backlight source to determine the corresponding backlight brightness, that is, the current backlight brightness. By subtracting the adjustment brightness from the current backlight brightness to obtain the reduced backlight brightness, and then using the backlight brightness to determine the corresponding current and applying the current to the backlight source, the backlight brightness is the backlight brightness after the reduction, which can reduce the backlight brightness. For example, the current backlight brightness is 100 lux, and the adjustment brightness is 10 lux, then the reduced backlight brightness is 90 lux.

Optionally, the brightness adjustment parameter may be an adjustment ratio, and the processing of the corresponding step 105 may be as follows:

based on the adjustment ratio, reducing the current backlight brightness.

The brightness adjustment parameter may be an adjustment ratio, such as 10%.

During implementation, after the terminal determines the adjustment ratio corresponding to the currently displayed interface image, the terminal may determine the current of the current backlight source, and then use the current of the backlight source to determine the corresponding backlight brightness, that is, the current backlight brightness.

By reducing the adjustment ratio based on the current backlight brightness, i.e., calculating the product of the current backlight brightness and the adjustment ratio corresponding to the interface image, and then subtracting the calculated product from the current backlight brightness to obtain the reduced backlight brightness, or multiplying the adjustment ratio corresponding to the interface image based on the current backlight brightness to obtain the reduced backlight brightness, and then using the backlight brightness to determine the corresponding current and applying the current to the backlight source, the backlight brightness is the backlight brightness after the reduction, which can reduce the backlight brightness.

For example, the current backlight brightness is 100 lux, and the adjustment ratio is 10%, then the reduced backlight brightness is 100 lux*(1−10)%, that is, 90 lux. Alternatively, the current backlight brightness is 100 lux, and the adjustment ratio is 90%, then the adjusted backlight brightness is 100 lux*90%, i.e., 90 lux.

In some the embodiments of the present disclosure, a rule for setting the brightness adjustment parameter is also provided.

For an image, the existing contrast formula is C=(Lbrightness+R)/(Ldarkness+R), R is the reflection brightness of the screen, which is a fixed value for a terminal, Lbrightness is the brightness of the brightest content of the image, and Ldarkness is the brightness of the darkest content of the image. If the contrast of an image is relatively high.

For example, Lbrightness is 200, Ldarkness is 10, R is 10, and then the contrast is C1=(200+10)/(10+10)=10.5, if the backlight brightness of this image is reduced by 10%, then Lbrightness is changed to 180, Ldarkness is changed to 9, and the contrast is C2=(180+10)/(9+10)=10. After the reduction, the contrast is still relatively high, and the user can still see the content clearly.

If the contrast of an image is relatively low, for example, Lbrightness is 200, Ldarkness is 190, R is 10, and the contrast is C1=(200+10)/(190+10)=1.05, if the backlight brightness is reduced by 10%, then Lbrightness changes to 180, Ldarkness becomes 171, and the contrast is C2=(180+10)/(171+10)=1.049. After the reduction, the contrast becomes smaller, and the content may not be clear.

Based on the above conclusions, for a content having a relatively high contrast, power consumption can be reduced by reducing the backlight brightness.

Therefore, when the technician sets the corresponding relationship between the contrast range and the brightness adjustment parameter, generally, for an interface having a relatively high contrast, the reduced amount of the backlight brightness is relatively large; and for a content having a relatively low contrast, the backlight brightness is not processed, or the reduced amount of the backlight brightness is relatively small. The interface images with a relatively high contrast generally include a chat window, a word document, an email interface, and the like. The interface image with a relatively low contrast includes a product list interface in a shopping application, and the like.

In some embodiments of the present disclosure, the currently displayed interface image is acquired, and the grayscale of each pixel point of the interface image is determined; in the grayscales of all the pixel points, the number of each grayscale is determined; N grayscales are acquired, the numbers of the N grayscales being the first N largest numbers, where N is a preset positive integer; when each difference between the N grayscales exceeds a first preset value, and a ratio of a sum of the numbers of the N grayscales to a sum of the numbers of all the grayscales exceeds a second preset value, a brightness adjustment parameter corresponding to the interface image is determined; and a current backlight brightness is reduced based on the brightness adjustment parameter. In this way, when certain interface images are displayed, the backlight brightness can be reduced, so that the current of the backlight source can be reduced, which in turn can reduce the power consumption and provide a method for reducing the power consumption of the screen of the mobile phone.

Figure 3:
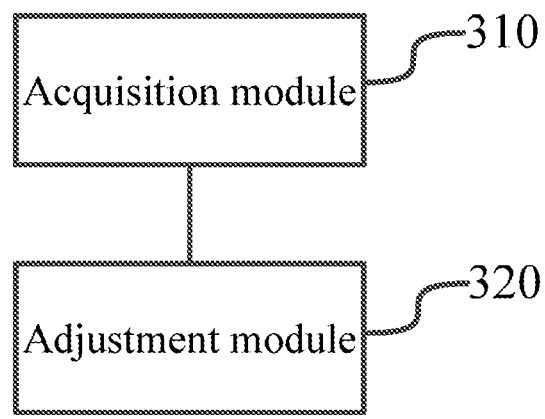
FIG. 3 is a schematic structural diagram of an apparatus for displaying an interface image according to some embodiments.

Based on the same technical concept, another exemplary embodiment of the present disclosure further provides an apparatus for displaying an interface image. As shown in FIG. 3, the apparatus includes: an acquisition portion 310, and an adjustment portion 320.

The various portions may have modular configurations, or are composed of discrete components, but nonetheless may be referred to as "modules."

The acquisition module 310 is configured to acquire a currently displayed interface image, and determine a grayscale of each pixel point of the interface image.

The acquisition module 310 is further configured to determine the number of each grayscale in the grayscales of all the pixel points.

The acquisition module 310 is further configured to acquire N grayscales, the numbers of the N grayscales being the first N largest numbers, where N is a preset positive integer.

The acquisition module 310 is further configured to, when each difference between the N grayscales exceeds a first preset value, and a ratio of a sum of the numbers of the N grayscales to a sum of the numbers of all the grayscales exceeds a second preset value, determine a brightness adjustment parameter corresponding to the interface image.

The adjustment module 320 is configured to reduce a current backlight brightness based on the brightness adjustment parameter.

Optionally, the acquisition module 310 is further configured to:
determine a contrast of the interface image; and
determine a brightness adjustment parameter corresponding to a contrast range to which the contrast of the interface image belongs according to a pre-stored corresponding relationship between the contrast range and the brightness adjustment parameter.

Optionally, the acquisition module 310 is further configured to:
acquire a current ambient light brightness; and
determine the brightness adjustment parameter corresponding to the interface image according to the current ambient light brightness, the contrast of the interface image, and a pre-stored corresponding relationship among the contrast range, the ambient light brightness range, and the brightness adjustment parameter.

Optionally, the acquisition module 310 is further configured to:
acquire a current backlight brightness; and
determine the brightness adjustment parameter corresponding to the interface image according to the current backlight brightness, the contrast corresponding to the interface image, and a pre-stored corresponding relationship among the contrast range, the backlight brightness range, and the brightness adjustment parameter.

Optionally, the acquisition module 310 is further configured to:
acquire a current ambient light brightness; and
determine that the current ambient brightness is within a preset brightness range.

Optionally, the acquisition module 310 is further configured to:
acquire a current backlight brightness; and
determine that the current backlight brightness is greater than a third preset value.

Optionally, the brightness adjustment parameter is an adjustment brightness; and
the adjustment module 320 is configured to:
subtract the adjustment brightness corresponding to the interface image from the current backlight brightness to obtain a reduced backlight brightness.

Optionally, the brightness adjustment parameter is an adjustment ratio; and
the adjustment module 320 is configured to:
multiply the current backlight brightness by the adjustment ratio corresponding to the interface image to obtain a reduced backlight brightness; or
calculate a product of the current backlight brightness and the adjustment ratio corresponding to the interface image, and subtract the product from the current backlight brightness to obtain the reduced backlight brightness.

Figure 4:
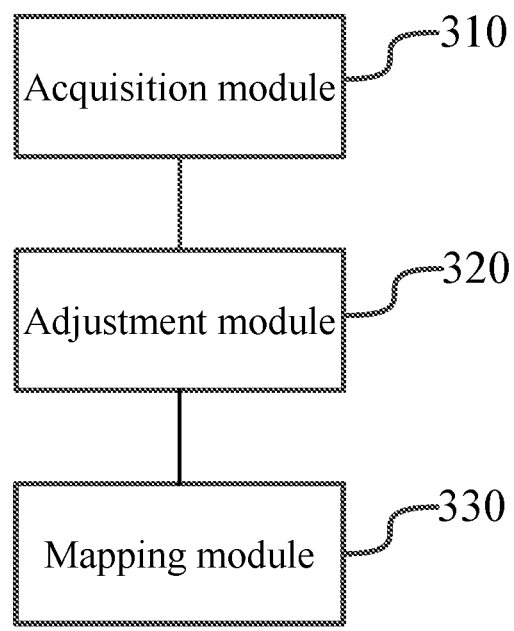
FIG. 4 is a schematic structural diagram of an apparatus for displaying an interface image according to some embodiments.

Optionally, as shown in FIG. 4, the apparatus further includes:
a mapping module 330 configured to map the interface image to an HSV space or a YUV space; and
the acquisition module 310 is configured to:
determine the grayscale of each pixel point of the interface image based on lightness information of the HSV space or lightness information of the YUV space.

In some embodiments of the present disclosure, the currently displayed interface image is acquired, and the grayscale of each pixel point of the interface image is determined; in the grayscales of all the pixel points, the number of each grayscale is determined; N grayscales are acquired, the numbers of the N grayscales being the first N largest numbers, where N is a preset positive integer; when each difference between the N grayscales exceeds a first preset value, and a ratio of a sum of the numbers of the N grayscales to a sum of the numbers of all the grayscales exceeds a second preset value, a brightness adjustment parameter corresponding to the interface image is determined; and a current backlight brightness is reduced based on the brightness adjustment parameter.

In this way, when certain interface images are displayed, the backlight brightness can be reduced, so that the current of the backlight source can be reduced, which in turn can reduce the power consumption and provide a method for reducing the power consumption of the screen of the mobile phone.

It should be noted that the apparatus for displaying an interface image provided by the above embodiments, when displaying the interface image, is only illustrated by using the division of the above-mentioned functional modules. In practical applications, the above functions may be assigned and completed by different functions according to requirements.

That is, the internal structure of the apparatus that displays the interface image is divided into different functional portions, modules, or blocks to complete all or some of the functions described above. In addition, the apparatus configured to display an interface image provided in the above embodiment and the method embodiment for displaying an interface image belong to the same concept, and for a specific implementation process thereof, reference is made to the method embodiment, which is not described herein again.

Yet another exemplary embodiment of the present disclosure provides a schematic structural diagram of a terminal. The terminal may be a mobile phone or the like.

Figure 5:
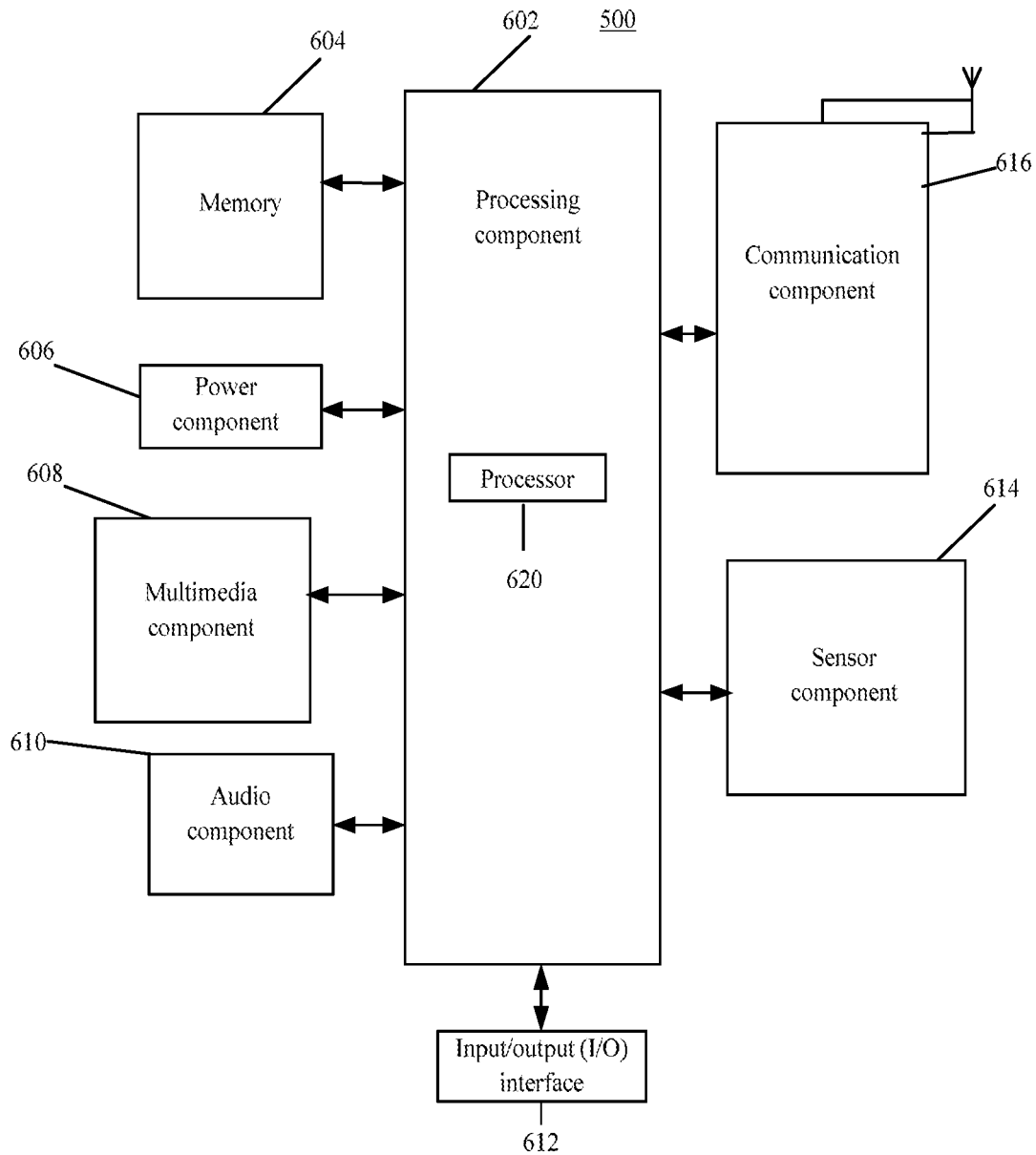
FIG. 5 is a schematic structural diagram of a terminal according to some embodiments.

Referring to FIG. 5, the terminal 500 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the terminal 500, such as the operations associated with display, telephone calls, data communications, camera operations, and recording operations. The processing component 602 may include one or more processors 620 to execute instructions to perform all or part of the steps in the above described methods.

Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the terminal 500. Examples of such data include instructions for any applications or methods operated on the terminal 500, contact data, phonebook data, messages, pictures, video, etc.

The memory 604 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the terminal 500. The power component 606 may include a power management system, one or more power sources, and any other components associated with the generation, management, and distribution of power in the terminal 500.

The multimedia component 608 includes a screen providing an output interface between the terminal 500 and the user. In some embodiments, the screen may include a liquid crystal display (LCD) and a touch panel (TP).

In some embodiments, other types of displays, such as a light-emitting diode (LED) display, an organic LED (OLED) display, a micro LED (μLED) display, a quantum-dot LED (QLED) display, etc. The displays can be touch screens as well.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive an external multimedia datum while the terminal 500 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 500 is in an operation mode, such as a call mode, a recording mode, and a voice recognition mode. The received audio signal may be further stored in the memory 604 or transmitted via the communication component 616.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the terminal 500. For instance, the sensor component 614 may detect an open/closed status of the terminal 500, relative positioning of components, e.g., the display and the keypad, of the terminal 500, a change in position of the terminal 500 or a component of the terminal 500, a presence or absence of user contact with the terminal 500, an orientation or an acceleration/deceleration of the terminal 500, and a change in temperature of the terminal 500.

The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the terminal 500 and other devices. The terminal 500 can access a wireless network based on a communication standard, such as WiFi, 2G or 3G or a combination thereof. In one exemplary embodiment, the communication component 616 receives a broadcast signal or broadcast associated information from an external broadcast management system via a broadcast channel.

In some embodiments, the communication component 616 further includes a near field communication (NFC) module to facilitate short-range communications. For example, the NFC module may be implemented based on a radio frequency identification (RFID) technology, an infra-red data association (IrDA) technology, an ultra-wideband (UWB) technology, a Bluetooth (BT) technology, and other technologies.

In some embodiments, the terminal 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium is provided including instructions, such as the memory 604 including instructions, the above instructions are executable by the processor 620 in the device 500, for performing the above-described methods. For example, the non-transitory computer-readable storage medium may be a ROM, a RAM, a CD-ROM, a magnetic tape, a floppy disk, optical data storage equipment, a flash drive such as a USB drive or an SD card, and the like.

The non-transitory computer readable storage medium, when instructions in the storage medium is executed by the processor of the terminal, enables the terminal to perform the above-mentioned method, the method including:

acquiring a currently displayed interface image, and determining a grayscale of each pixel point of the interface image;

in the grayscales of all the pixel points, determining the number of each grayscale;

acquiring N grayscales, the numbers of the N grayscales being the first N largest numbers, where N is a preset positive integer;

when each difference between the N grayscales exceeds a first preset value, and a ratio of a sum of the numbers of the N grayscales to a sum of the numbers of all the grayscales exceeds a second preset value, determining a brightness adjustment parameter corresponding to the interface image; and reducing a current backlight brightness based on the brightness adjustment parameter.

Alternatively, the determining the brightness adjustment parameter corresponding to the interface image includes:

determining a contrast of the interface image; and determining a brightness adjustment parameter corresponding to a contrast range to which the contrast of the interface image belongs according to a pre-stored corresponding relationship between the contrast range and the brightness adjustment parameter.

Alternatively, the determining the brightness adjustment parameter corresponding to the contrast range to which the contrast of the interface image belongs according to the pre-stored corresponding relationship between the contrast range and the brightness adjustment parameter includes:

acquiring a current ambient light brightness; and determining the brightness adjustment parameter corresponding to the interface image according to the current ambient light brightness, the contrast of the interface image, and a pre-stored corresponding relationship among the contrast range, the ambient light brightness range and the brightness adjustment parameter.

Alternatively, the determining the brightness adjustment parameter corresponding to the contrast range to which the contrast of the interface image belongs according to the pre-stored corresponding relationship between the contrast range and the brightness adjustment parameter includes:

acquiring a current backlight brightness;

determining the brightness adjustment parameter corresponding to the interface image according to the current backlight brightness, the contrast corresponding to the interface image, and a pre-stored corresponding relationship among the contrast range, the backlight brightness range, and the brightness adjustment parameter.

Alternatively, before determining the grayscale of each pixel point of the interface image, the method further includes:

acquiring a current ambient light brightness; and determining that the current ambient brightness is within a preset brightness range.

Alternatively, before determining the grayscale of each pixel point of the interface image, the method further includes:

acquiring a current backlight brightness; and determining that the current backlight brightness is greater than a third preset value.

Alternatively, the brightness adjustment parameter is an adjustment brightness; and the reducing the current backlight brightness according to the brightness adjustment parameter, includes:

subtracting the adjustment brightness corresponding to the interface image from the current backlight brightness to obtain a reduced backlight brightness.

Alternatively, the brightness adjustment parameter is an adjustment ratio; and the reducing the current backlight brightness according to the brightness adjustment parameter, includes:

multiplying the current backlight brightness by the adjustment ratio corresponding to the interface image to obtain a reduced backlight brightness; or calculating a product of the current backlight brightness and the adjustment ratio corresponding to the interface image, and subtracting the product from the current backlight brightness to obtain a reduced backlight brightness.

Alternatively, before determining the grayscale of each pixel point of the interface image, the method further includes:

mapping the interface image to an HSV space or a YUV space; and the determining the grayscale of each pixel point of the interface image, includes:

determining the grayscale of each pixel point of the interface image based on lightness information of the HSV space or lightness information of the YUV space.

In some embodiments of the present disclosure, the currently displayed interface image is acquired, and the grayscale of each pixel point of the interface image is determined; in the grayscales of all the pixel points, the number of each grayscale is determined; N grayscales are acquired, the numbers of the N grayscales being the first N largest numbers, where N is a preset positive integer; when each difference between the N grayscales exceeds a first preset value, and a ratio of a sum of the numbers of the N grayscales to a sum of the numbers of all the grayscales exceeds a second preset value, a brightness adjustment parameter corresponding to the interface image is determined; and a current backlight brightness is reduced based on the brightness adjustment parameter. In this way, when certain interface images are displayed, the backlight brightness can be reduced, so that the current of the backlight source can be reduced, which in turn can reduce the power consumption and provide a method for reducing the power consumption of the screen of the mobile phone.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The apparatuses and devices can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for displaying an interface image, comprising:
   acquiring a currently displayed interface image, and determining a grayscale of each of a plurality of pixel points of the interface image;
   in the grayscales of the plurality of pixel points, determining a number of each grayscale;
   acquiring N grayscales, the numbers of the N grayscales being the first N largest numbers, where N is a preset positive integer;
   when each difference between the N grayscales exceeds a first preset value, and a ratio of a sum of the numbers of the N grayscales to a sum of the numbers of all the grayscales exceeds a second preset value, determining a brightness adjustment parameter corresponding to the interface image; and
   reducing a current backlight brightness based on the brightness adjustment parameter;
   wherein the determining the brightness adjustment parameter corresponding to the interface image comprises:
   determining a contrast of the interface image; and
   determining a brightness adjustment parameter corresponding to a contrast range to which the contrast of the interface image belongs according to a pre-stored corresponding relationship between the contrast range and the brightness adjustment parameter.

2. The method according to claim 1, wherein the current backlight brightness is automatically reduced based on the brightness adjustment parameter for certain interface images to thereby reduce power consumption.

3. The method according to claim 1, wherein the determining the brightness adjustment parameter corresponding to the contrast range to which the contrast of the interface image belongs according to the pre-stored corresponding relationship between the contrast range and the brightness adjustment parameter comprises:
   acquiring a current ambient light brightness; and
   determining the brightness adjustment parameter corresponding to the interface image according to the current ambient light brightness, the contrast of the interface image, and a pre-stored corresponding relationship among the contrast range, the ambient light brightness range and the brightness adjustment parameter.

4. The method according to claim 1, wherein the determining the brightness adjustment parameter corresponding to the contrast range to which the contrast of the interface image belongs according to the pre-stored corresponding relationship between the contrast range and the brightness adjustment parameter comprises:
   acquiring a current backlight brightness;
   determining the brightness adjustment parameter corresponding to the interface image according to the current backlight brightness, the contrast corresponding to the interface image, and a pre-stored corresponding relationship among the contrast range, the backlight brightness range, and the brightness adjustment parameter.

5. The method according to claim 1, wherein prior to the determining the grayscale of each pixel point of the interface image, the method further comprises:
acquiring a current ambient light brightness; and
determining whether the current ambient brightness is within a preset brightness range.

6. The method according to claim 1, wherein prior to the determining the grayscale of each pixel point of the interface image, the method further comprises:
acquiring a current backlight brightness; and
determining whether the current backlight brightness is greater than a third preset value.

7. The method according to claim 1, wherein:
the brightness adjustment parameter is an adjustment brightness; and
the reducing the current backlight brightness according to the brightness adjustment parameter comprises:
subtracting the adjustment brightness corresponding to the interface image from the current backlight brightness to obtain a reduced backlight brightness.

8. The method according to claim 1, wherein:
the brightness adjustment parameter is an adjustment ratio; and
the reducing the current backlight brightness according to the brightness adjustment parameter comprises:
multiplying the current backlight brightness by the adjustment ratio corresponding to the interface image to obtain a reduced backlight brightness; or
calculating a product of the current backlight brightness and the adjustment ratio corresponding to the interface image, and subtracting the product from the current backlight brightness to obtain a reduced backlight brightness.

9. The method according to claim 1, wherein:
prior to the determining the grayscale of each pixel point of the interface image, the method further comprises:
mapping the interface image to an HSV space or a YUV space;
the determining the grayscale of each pixel point of the interface image comprises:
determining the grayscale of each pixel point of the interface image based on lightness information of the HSV space or lightness information of the YUV space.

10. A non-transitory computer-readable storage medium having at least one instruction, at least one program, code set, or instruction set stored thereon executable by a processor to perform:
acquiring a currently displayed interface image, and determining a grayscale of each pixel point of the interface image;
in the grayscales of all the pixel points, determining the number of each grayscale;
acquiring N grayscales, the numbers of the N grayscales being the first N largest numbers, where N is a preset positive integer;
when each difference between the N grayscales exceeds a first preset value, and a ratio of a sum of the numbers of the N grayscales to a sum of the numbers of all the grayscales exceeds a second preset value, determining a brightness adjustment parameter corresponding to the interface image; and
reducing a current backlight brightness based on the brightness adjustment parameter;
wherein the determining the brightness adjustment parameter corresponding to the interface image comprises:
determining a contrast of the interface image; and
determining a brightness adjustment parameter corresponding to a contrast range to which the contrast of the interface image belongs according to a pre-stored corresponding relationship between the contrast range and the brightness adjustment parameter.

11. The non-transitory computer-readable storage medium according to claim 10,
wherein the determining the brightness adjustment parameter corresponding to the contrast range to which the contrast of the interface image belongs according to the pre-stored corresponding relationship between the contrast range and the brightness adjustment parameter comprises:
acquiring a current ambient light brightness; and
determining the brightness adjustment parameter corresponding to the interface image according to the current ambient light brightness, the contrast of the interface image, and a pre-stored corresponding relationship among the contrast range, the ambient light brightness range and the brightness adjustment parameter.

12. An apparatus configured to display an interface image, the apparatus comprising:
a processor; and
memory storing at least one instruction, at least one program, a code set, or an instruction set for execution by the processor to perform:
acquiring a currently displayed interface image, and determining a grayscale of each pixel point of the interface image;
in the grayscales of all the pixel points, determining the number of each grayscale;
acquiring N grayscales, the numbers of the N grayscales being the first N largest numbers, where N is a preset positive integer;
when each difference between the N grayscales exceeds a first preset value, and a ratio of a sum of the numbers of the N grayscales to a sum of the numbers of all the grayscales exceeds a second preset value, determining a brightness adjustment parameter corresponding to the interface image; and
reducing a current backlight brightness based on the brightness adjustment parameter;
wherein the determining the brightness adjustment parameter corresponding to the interface image comprises:
determining a contrast of the interface image; and
determining a brightness adjustment parameter corresponding to a contrast range to which the contrast of the interface image belongs according to a pre-stored corresponding relationship between the contrast range and the brightness adjustment parameter.

13. The apparatus according to claim 12, wherein the processor is further configured to perform:
automatically reducing the current backlight brightness based on the brightness adjustment parameter for certain interface images thereby reducing power consumption of the apparatus.

14. The apparatus according to claim 13, wherein the processor is further configured to perform:
acquiring a current ambient light brightness; and
determining the brightness adjustment parameter corresponding to the interface image according to the current ambient light brightness, the contrast of the interface image, and a pre-stored corresponding relationship among the contrast range, the ambient light brightness range and the brightness adjustment parameter.

15. The apparatus according to claim 13, wherein the processor is further configured to perform:
acquiring a current backlight brightness;
determining the brightness adjustment parameter corresponding to the interface image according to the current backlight brightness, the contrast corresponding to the interface image, and a pre-stored corresponding relationship among the contrast range, the backlight brightness range, and the brightness adjustment parameter.

16. The apparatus according to claim 12, wherein the processor is further configured to perform:
acquiring a current ambient light brightness; and
determining that the current ambient brightness is within a preset brightness range.

17. The apparatus according to claim 12, wherein the processor is further configured to perform:
acquiring a current backlight brightness; and
determining that the current backlight brightness is greater than a third preset value.

18. The apparatus according to claim 12, wherein the brightness adjustment parameter is an adjustment brightness; and
wherein the processor is further configured to perform:
subtracting the adjustment brightness corresponding to the interface image from the current backlight brightness to obtain a reduced backlight brightness.

19. The apparatus according to claim 12, wherein the brightness adjustment parameter is an adjustment ratio; and
wherein the processor is further configured to perform:
multiplying the current backlight brightness by the adjustment ratio corresponding to the interface image to obtain a reduced backlight brightness; or
calculating a product of the current backlight brightness and the adjustment ratio corresponding to the interface image, and subtracting the product from the current backlight brightness to obtain a reduced backlight brightness.

20. The apparatus according to claim 12, wherein the processor is further configured to perform:
mapping the interface image to an HSV space or a YUV space; and
the determining the grayscale of each pixel point of the interface image, comprises:
determining the grayscale of each pixel point of the interface image based on lightness information of the HSV space or lightness information of the YUV space.

* * * * *